United States Patent Office 3,243,462
Patented Mar. 29, 1966

3,243,462
PROCESS FOR PREPARING DIMETHYL-HYDROXYLAMINE
Herbert Q. Smith, Trenton, N.J., assignor to Pennsalt Chemicals Corporation, Philadelphia, Pa., a corporation of Pennsylvania
No Drawing. Original application Mar. 30, 1961, Ser. No. 99,354. Divided and this application Dec. 4, 1963, Ser. No. 328,104
4 Claims. (Cl. 260—583)

This application is a division of my application Serial No. 99,354, filed March 30, 1961, and now abandoned.

This invention relates to an improved process for dimethylhydroxylamine and particularly deals with a catalytic process for its preparation by oxidation of dimethylamine with hydrogen peroxide.

Dimethylhydroxylamine is a known compound having utility as a shortstop for polymerization of olefins in the production of synthetic rubber. It is known to prepare dimethylhydroxylamine by various techniques, as for example, (a) by the action of ethyl nitrate on a methyl magnesium halide (J. Am. Chem. Soc., 79,796, (1957)), and (b) by pyrolysis of amine oxides such as N,N-dimethylcyclohexylmethylamine oxide (Org. Synth., 39, p. 40). These methods are obviously not conducive to an economic commercial practice and a simpler, more desirable method is desirable.

As early as 1899 Dunstan and Goulding attempted to prepare dimethylhydroxylamine by oxidation of dimethylamine with hydrogen peroxide (J. Chem. Soc. 75, 1009 (1889)). Although the peroxide reacted after 24 hours, only about 50% of the amine was attacked and the chief reaction products were nitrous acid, formic acid, and formaldehyde. No dimethylhydroxylamine could be detected. Surprisingly, however, these authors disclosed that oxidation of diethylamine with hydrogen peroxide does yield diethylhydroxylamine. The reaction is also operable with the higher homologues. Thus it is clear that the peroxide oxidation of dimethylamine is not analogous to its homologues. This unexpected behavior is confirmed by my experience in that I have now discovered that a specific class of materials which are not catalysts for the peroxide oxidation of diethylamine do catalyze the peroxide oxidation of dimethylamine to dimethylhydroxylamine.

Thus, in accord with this invention, dimethylamine may be converted to dimethylhydroxylamine by oxidation with hydrogen peroxide in the presence of a catalyst selected from the group of oxides, oxygen acids, and alkali metal salts of oxygen acids of selenium, molybdenum, tungsten, vanadium and uranium.

The process of thiis invention is carried out in an inert medium which has mutual solubility for dimethylamine and the peroxide. Examples of satisfactory solvents are water, anhydrous or aqueous methanol, ethanol and other lower aliphatic alcohols (e.g. isopropanol, the butanols, etc.) and also the lower molecular weight ketones such as acetone, diethylketone, methyl ethyl ketone, and the like. The catalyst need not be completely in solution and its mere presence as a dispersion is adequate although some solubility is usually obtained.

The process is usually carried out with aqueous hydrogen peroxide which is commonly available at a concentration of approximately 30% by weight $H_2O_2$. However, other concentrations of $H_2O_2$ may be used either in aqueous or alcoholic solution. Likewise, anhydrous $H_2O_2$ may be employed if not considered too hazardous to handle. Preferably, however, aqueous or alcoholic solutions of hydrogen peroxide containing from about 5% to 75% by weight $H_2O_2$ will be employed. The amount of peroxide used should be essentially stoichiometric. If less is used, it will leave some amine unreacted. On the other hand, large excesses of peroxide are operable, but contribute nothing to the process. In general, a small excess of about 10% over stoichiometric amounts may be employed to ensure completion of the reaction.

The process conditions and techniques used to carry out the process of this invention are conventional. Temperatures of about −20° to 20° or lower will normally be used since temperatures above about 25° to 30° C. result in lower conversions. Although the mode of addition is not important it is preferred to add the hydrogen peroxide to a stirred mixture of the amine, solvent, and catalyst. The reaction may be followed by determining the amount of unreacted hydrogen peroxide in an aliquot sample taken from the reaction mass.

The dimethylhydroxylamine product may be isolated, if desired, as a salt and this is done simply by evaporation of an aqueous solution of the dimethylhydroxylamine salt (e.g. the hydrochloride, sulfate, picrate, etc.). Usually, however, there is no need to isolate the product since it may be used as the aqueous solution obtained directly after filtering off solid catalyst.

The catalysts which are useful in this process are, as indicated, those selected from the group consisting of oxides, oxygen acids, and alkali metal salts of oxygen acids of selenium, molybdenum, tungsten, vanadium, and uranium and thus will include $SeO_2$, $MoO_3$, $WO_2$, $WO_3$, $V_2O_3$, $V_2O_5$, $U_3O_8$, $UO_3$, selenic acid, selenious acid, molybdic acid, sodium molybdate, tungstic acid, sodium tungstate, potassium tungstate, vanadic acid, sodium orthovanadate ($Na_3VO_4$), sodium metavanadate ($NaVO_3$), potassium pyrovanadate ($K_4V_2O_7$), sodium selenate, lithium molybdate, sodium uranate and $H_2UO_4$. Of this group the tungstates are most preferred, particularly sodium tungstate. It will be understood that when free acids are employed they will form the amine salt when added to the reaction vessel, but the amount of catalyst used is so small as to not significantly affect the amount of amine available for reaction. However, because of availability and cost, the alkali metal salts will usually be employed and these acid salt catalysts are usually used as the hydrated salts. The amount of catalyst employed may vary considerably and is effective at levels as low as about 0.5% by weight of the tertiary amine used. As high as 10% by weight of the amine may be used effectively, but preferably from about 1% to 5% of the amine will be employed.

The following examples will serve to further illustrate the invention.

EXAMPLE 1

A 25 percent by weight aqueous solution containing 0.104 mole parts by weight of dimethylamine was prepared and cooled to −5° C. and sodium tungstate dihydrate added in an amount equivalent to 3% by weight of the amine. Then 0.104 mole part by weight of hydrogen peroxide as a 30% aqueous solution was dropped in with stirring over a 15 minute period. At the end of the addition, 99.9% of the peroxide was consumed as determined by iodimetric titration of an aliquot sample. Gas chromatography of the reaction solution using a 7-foot column of 35% N,N,N′,N′,-tetra(hydroxyethyl) ethylenediamine on crushed diatomaceous earth fused with a small amount of sodium carbonate ("Chromasorb" W), at 100° C. and 15 p.s.i.g. helium carrier gas showed 23% conversion of the dimethylamine to dimethylhydroxylamine. The product was trapped from the effluent of the chromatograph and its infrared spectrum obtained. The spectrum confirmed the product as dimethylhydroxylamine.

When the above example was repeated, but without the sodium tungstate catalyst, 98.9% of the peroxide was consumed at the end of the addition, but no trace of dimethyldroxylamine could be detected.

EXAMPLE 2

Example 1 was repeated, but at room temperature using sodium molybdate catalyst thus obtaining a somewhat lower conversion of dimethylamine to dimethylhydroxylamine.

Instead of using sodium tungstate in Example 1, selenium dioxide, sodium vanadate, uranic acid ($H_2UO_4$) and selenic acid ($H_2SeO_4$) are used with equivalent results.

EXAMPLE 3.—EFFECT OF CATALYST ON DIETHYLAMINE OXIDATION

A. *Standard oxidation in absence of catalyst*

To a stirred solution of 73.1 g. (1.0 mole) of diethylamine in 50 ml. of water was added 161 g. (1.45 moles) of 30.7% hydrogen peroxide over six hours with occasional cooling to keep the temperature at 25–30° C. After overnight standing, 6.2% of the hydrogen peroxide remained unreacted. To the solution was added 75 ml. of 50% caustic solution and the resulting upper layer was treated with another 25 ml. of 50% caustic and then dried over 5 g. of flake caustic. A small additional amount of upper layer was formed when the combined aqueous layers were treated with another 50 ml. of 50% caustic solution.

The organic phase was filtered from the caustic and distilled, giving 25.5 g. (28.6% conversion, 31% yield) of diethylhydroxylamine, pale yellow liquid, B.P. 53, 57–58° C. at 24–25 mm., $n_D^{26}$ 1.4179, specific gravity 0.865.

B. *Use of catalyst*

The above experiment (3–A) was repeated except that 1% by weight of the amine of sodium tungstate dihydrate was present during the peroxide addition which in this case was one hour because of the increased activity found. However, on work-up a conversion of only 16.6% to diethylhydroxylamine was obtained. Thus it is clear that the use of catalyst adversely affects peroxide oxidation of diethylamine to diethylhydroxylamine.

It will be understood that numerous changes may be made from the above description and examples without departing from the spirit and scope of the invention.

I claim:

1. A process for the preparation of dimethylhydroxylamine which consists of oxidizing dimethylamine with essentially stoichiometric amounts of hydrogen peroxide in the presence of about 0.5% to about 10% by weight of the amine of a catalyst selected from the group consisting of sodium vanadate, potassium vanadate, selenium dioxide, sodium selenate and selenic acid said process being conducted in an inert solvent at a temperature between about −20° and about 20° C.

2. A process for the preparation of dimethylhydroxylamine which consists of oxidizing dimethylamine with essentially stoichiometric amounts of hydrogen peroxide in the presence of about 1% to about 5% by weight of the amine of the catalyst selected from the group consisting of sodium vanadate, potassium vanadate, selenium dioxide, sodium selenate and selenic acid said process being conducted in an inert solvent at a temperature between about −20° and 20° C.

3. The process of claim 2 in which the catalyst is selenium dioxide.

4. The process of claim 2 in which the catalyst is sodium vanadate.

References Cited by the Examiner

UNITED STATES PATENTS

| | | | |
|---|---|---|---|
| 2,627,526 | 2/1953 | Du Brow et al. | 260—583 |
| 2,795,611 | 6/1957 | List | 260—583 |

FOREIGN PATENTS 664,425   8/1956   Germany.

CHARLES B. PARKER, *Primary Examiner.*

FLOYD D. HIGEL, ROBERT V. HINES,
*Assistant Examiners.*